United States Patent
Sheldon et al.

(10) Patent No.: US 9,811,366 B2
(45) Date of Patent: Nov. 7, 2017

(54) DYNAMICALLY USING SYSTEM MEMORY AS VIDEO MEMORY FOR VIRTUAL GRAPHICS PROCESSING UNITS

(71) Applicant: VMware, Inc., Palo Alto, CA (US)

(72) Inventors: Mark Sheldon, Mountain View, CA (US); Jeffrey W. Sheldon, Mountain View, CA (US); Michael Banack, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 271 days.

(21) Appl. No.: 14/485,084

(22) Filed: Sep. 12, 2014

(65) Prior Publication Data
US 2016/0078585 A1    Mar. 17, 2016

(51) Int. Cl.
*G06F 9/455*    (2006.01)
*G06T 1/60*    (2006.01)

(52) U.S. Cl.
CPC ............ *G06F 9/45558* (2013.01); *G06T 1/60* (2013.01); *G06F 2009/45583* (2013.01); *G06T 2200/28* (2013.01)

(58) Field of Classification Search
CPC .. G06F 9/455; G06F 9/45504; G06F 9/45508; G06F 9/45512; G06F 9/45516; G06F 9/4552; G06F 9/45525; G06F 9/45529; G06F 9/45533; G06F 9/45537; G06F 9/45545; G06F 9/4555; G06F 9/45554; G06F 9/45558; G06F 2009/45562; G06F 2009/45566; G06F 2009/45575; G06F 2009/45579; G06F 2009/45583; G06F 9/545

See application file for complete search history.

(56) References Cited

U.S. PATENT DOCUMENTS

| | | | | |
|---|---|---|---|---|
| 7,433,951 B1* | 10/2008 | Waldspurger | ......... | G06F 9/5016 709/223 |
| 2006/0250417 A1* | 11/2006 | Stauffer | ................... | G06F 12/12 345/619 |
| 2008/0303833 A1* | 12/2008 | Swift | ..................... | G06T 15/005 345/505 |
| 2011/0066786 A1* | 3/2011 | Colbert | ............... | G06F 9/45558 711/6 |
| 2012/0117299 A1* | 5/2012 | Waldspurger | ......... | G06F 12/122 711/6 |
| 2012/0210066 A1* | 8/2012 | Joshi | .................... | G06F 12/0866 711/118 |
| 2012/0266165 A1* | 10/2012 | Cen | ........................ | G06F 9/4856 718/1 |
| 2012/0331242 A1* | 12/2012 | Shaikh | ................ | G06F 12/0261 711/154 |
| 2013/0019067 A1* | 1/2013 | Vilayannur | ............. | G06F 12/08 711/144 |

(Continued)

*Primary Examiner* — Maurice L McDowell, Jr.
*Assistant Examiner* — Donna J Ricks

(57) ABSTRACT

Techniques for dynamically using system (i.e., VM guest) memory as video memory for virtual graphics processing units (VGPUs) are provided. In one embodiment, a guest graphics driver running within a virtual machine (VM) of a host system can receive, from a guest application of the VM, a request to create a graphics resource. The guest graphics driver can then dynamically allocate, in response to the request, a memory object for the graphics resource in a guest memory space of the VM.

21 Claims, 6 Drawing Sheets

(56) References Cited

U.S. PATENT DOCUMENTS

| | | | |
|---|---|---|---|
| 2014/0115036 A1* | 4/2014 | Lai | H04L 67/08 709/203 |
| 2014/0196037 A1* | 7/2014 | Gopalan | G06F 9/4856 718/1 |
| 2015/0058576 A1* | 2/2015 | Galbraith | G06F 12/0871 711/133 |

* cited by examiner

DYNAMICALLY USING SYSTEM MEMORY AS VIDEO MEMORY FOR VIRTUAL GRAPHICS PROCESSING UNITS

BACKGROUND

In the field of computer graphics, a graphics processing unit (GPU) is a specialized circuit that can, e.g., accelerate the generation of images comprising 2D and/or 3D elements for presentation on a display device (e.g., a computer monitor), perform general-purpose parallel computation tasks, and more. A typical GPU performs its graphics operations on data maintained in dedicated video memory that is separate from general system memory. A graphics driver manages the task of moving data between system memory and video memory so that data in the GPU's current working set is available in video memory for use by the GPU.

When a GPU is virtualized (such as in a host system comprising one or more virtual machines (VMs)), the management of video memory becomes more complicated because each VM has its own guest graphics driver, which communicates with a virtual graphics processing unit (VGPU) rather than with a physical GPU. Each VGPU, in turn, communicates with a host graphics driver that interacts with the graphics hardware. In this virtualized scenario, the guest graphics driver for a VM generally does not write graphics data directly to the video memory of the GPU; instead, the guest graphics driver works with the VGPU to write such data to a virtual representation of video memory, which the VGPU may then propagate to physical video memory via the host graphics driver if appropriate (e.g., if space is available).

There are several ways to implement this virtual representation of video memory. According to a first approach, each VGPU can reserve a static pool of guest memory within its corresponding VM for use as a virtual video memory pool. The guest graphics driver of the VM can manage the movement of graphics data between guest application memory and the static guest memory pool as if the static pool were physical video memory. The VGPU can subsequently read the data from the static guest memory pool and pass it to the graphics hardware for storage in video memory. The problem with this approach is that it is inefficient because of the multiple memory read/writes involved, and because each guest graphics driver needs to perform complicated memory management of the static guest memory pool (which ultimately may not reflect the actual placement of data in video memory). Further, reserving a static memory pool in each VM for graphics means that the total amount of guest memory available for other purposes is reduced, even when no applications are making significant use of the GPU.

According to a second approach, the guest graphics driver can provide graphics data directly to the VGPU, without writing the data in a static guest memory pool. The VGPU can then store a local copy of the graphics data in a hypervisor-based virtual video memory pool and can interact with the host graphics driver to propagate that data to physical video memory. The problem with this approach is that it is difficult to appropriately manage the allocation of host memory for the hypervisor-based memory pool. It is possible for each guest graphics driver to implement a limit on the amount of graphics data it sends to the VGPU, but it is undesirable for the guest graphics driver to be in control of this. For instance, if this limit needed to be reduced (due to, e.g., host memory pressure), the hypervisor would not want to rely on the guest graphics driver to implement the reduction, due to timeliness and security reasons.

Further, if no limits are placed on the amount of graphics data that each VM can send to the VGPU layer, the VMs can potentially send a volume of data that exceeds the amount of physical host memory allocated for the hypervisor-based pool, resulting in host swapping and reduced overall system performance. While this performance degradation may be acceptable in certain computing contexts, it is problematic in virtualized environments/systems, which are generally designed to provide performance guarantees to end-users. For example, when a user wishes to power-on a VM on a given host system, the hypervisor of the host system typically checks whether all of the physical resources (e.g., compute, memory, storage, etc.) needed to run the VM at a predefined level of performance are available. If not, the VM is not allowed to be powered on. It is difficult to enforce such performance guarantees in the scenario with no limits above because the hypervisor will not know, a priori, the upper bound of host memory that will be needed at runtime for graphics operations.

SUMMARY

Techniques for dynamically using system (i.e., VM guest) memory as video memory for VGPUs are provided. In one embodiment, a guest graphics driver running within a VM of a host system can receive, from a guest application of the VM, a request to create a graphics resource. The guest graphics driver can then dynamically allocate, in response to the request, a memory object for the graphics resource in a guest memory space of the VM.

The following detailed description and accompanying drawings provide a better understanding of the nature and advantages of particular embodiments.

DETAILED DESCRIPTION

Figure 1:
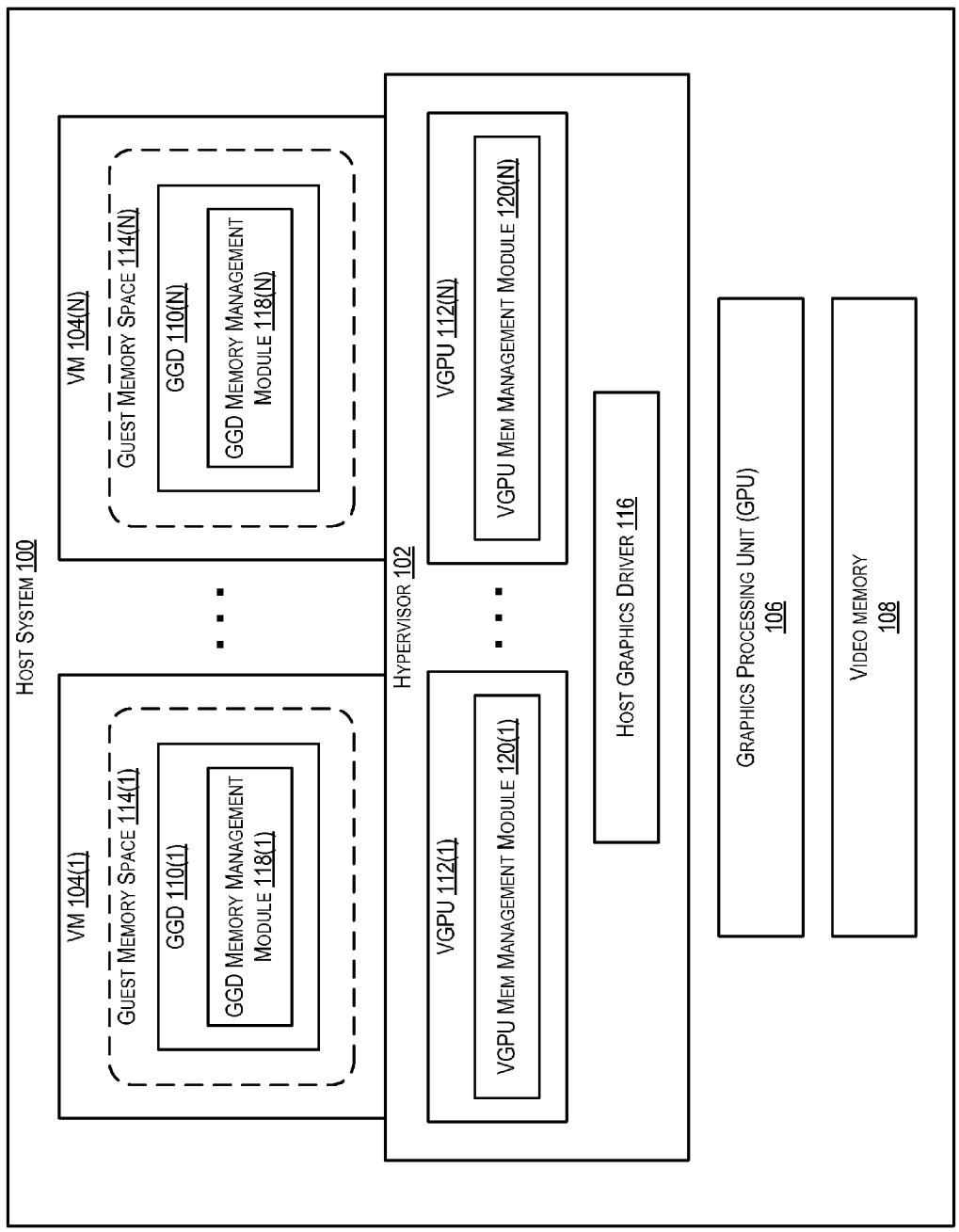
FIG. 1 depicts a host system that supports the dynamic usage of system (i.e., VM guest) memory as video memory for one or more VGPUs according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that enable a VGPU and corresponding guest graphics driver to dynamically share portions of the system (i.e., guest) memory of a VM for storing graphics resources to be used/operated on by a physical GPU. Stated another way, these techniques allow the VGPU and guest graphics driver to implement virtual video memory by allocating and storing graphics resources on an as-needed, per-resource basis in the guest memory space of the VM (rather than in a static guest memory pool or a hypervisor-based pool as in some other implementations).

For example, at the time a guest application requests the creation of a graphics resource such as a context, surface, texture, or the like, the guest graphics driver running within the VM (in conjunction with the VGPU) can dynamically allocate a memory object in guest memory to hold data for the graphics resource. In a particular embodiment, this memory object can comprise scatter-gathered memory pages from the VM's guest memory space. Once the memory object has been allocated and filled-in with data, the VGPU can pass a copy of the graphics resource (with its data and metadata) down the graphics stack of the hypervisor to the host graphics driver. The host graphics driver can then take appropriate steps for writing the graphics resource to physical video memory, thereby enabling the GPU to operate on it.

To support this dynamic shared memory model, the VGPU and the guest graphics driver can implement a number of synchronization primitives. Among other things, these synchronization primitives can (1) allow the guest graphics driver to notify the VGPU when a graphics resource backed by a memory object in guest memory has been updated, (2) allow the guest graphics driver to notify the VGPU when a memory object for a particular graphics resource is no longer needed, and (3) allow the VGPU to write-back, to guest memory, data for a graphics resource that has been modified by the GPU (such as a render target).

Further, in certain embodiments, the VGPU can implement algorithms for caching copies of guest-backed graphics resources at the hypervisor level. This caching, which is fully supported by the synchronization primitives noted above, can optimize graphics rendering by reducing the movement of data between the user (i.e., VM level) and hypervisor sessions. In various embodiments, the VGPU and guest graphics driver can cooperate using the synchronization primitives to keep the versions of the graphics resources in guest memory up-to-date. Accordingly, the VGPU cache can be flushed as needed in response to host memory pressures or other conditions/events.

FIG. 1 depicts a host system 100 that supports the dynamic usage of VM guest memory as video memory for one or more VGPUs according to an embodiment. As shown, host system 100 includes a virtualization software layer (i.e., hypervisor) 102 that provides an environment in which VMs 104(1)-104(N) can run.

Host system 100 further includes a GPU 106 and an associated video memory 108. GPU 106 and video memory 108 are collectively responsible for, among other things, performing/accelerating graphics operations in order to display 2D and/or 3D graphics on, e.g., a monitor or other output device communicatively coupled with host system 100. In one embodiment, GPU 106 and video memory 108 can be discrete physical components of host system 102, such as a dedicated GPU and VRAM modules located on a removable graphics card. In other embodiments, GPU 106 and video memory 108 can be integrated with other physical components of host system 102. For example, GPU 106 may be integrated into a general purpose CPU of system 102, and video memory 108 may be part of the host system memory (e.g., DRAM) of system 102. In yet other embodiments, GPU 106 can be implemented partially or entirely in software, such as in the form of a software-based graphics renderer.

To enable VMs 104(1)-104(N) to make use of GPU 106 for graphics rendering tasks, each VM 104 includes a guest graphics driver (e.g., GGDs 110(1)-110(N)). In addition, hypervisor 102 includes a set of VGPUs 112(1)-112(N) (one per VM). Generally speaking, each GGD 110 can receive graphics commands from applications running within the guest memory space (114) of its host VM 104 and can pass those commands in an appropriate format to corresponding VGPU 112. VGPU 112, which is a virtual representation of GPU 106, can process the commands as needed (for, e.g., optimization, translation, resource management, etc.) and can propagate the commands to a host graphics driver 116 within hypervisor 102. Finally, host graphics driver 116 can interact with GPU 106/video memory 108 to cause the graphics operations corresponding to the commands to be executed.

As noted in the Background section, when a GPU is virtualized for use by a VM as in FIG. 1, the VGPU corresponding to the VM typically needs to maintain a virtual representation of the video memory consumed by the VM's applications. There are a number of known ways to implement this, such as via a static guest memory pool or a hypervisor-based memory pool. However, these existing approaches suffer from various drawbacks (e.g., complex memory management on the guest side, inefficient guest memory usage, inability to define hard memory limits on the host, etc.).

To address the foregoing and other similar issues, each GGD 110 and VGPU 112 of FIG. 1 can implement a dynamic shared system memory model for virtual video memory via a GGD memory management module 118 and a VGPU memory management module 120. With this model, when a guest application of a VM 104 wants to define/create a graphics resource (e.g., context, surface, texture, vertex buffer, etc.) in video memory for use by VGPU 112, modules 118 and 120 can work in concert to dynamically allocate a portion of the guest memory of VM 104 for storing data for the graphics resource. Unlike the "static guest memory pool" approach, this portion (referred to as a memory object) is allocated on-demand from potentially scatter-gathered pages within guest memory space 114. The memory object can be considered a canonical location for storing the most up-to-date version of the resource.

Then, once the allocated memory object has been filled-in with data, modules 118 and 120 can carry out workflows for synchronizing the graphics resource between guest memory space 114 and video memory 108 of GPU 106. For example, one such workflow (implemented via an "update" synchronization primitive/command) can allow GGD 110 to notify VGPU 112 when data for the resource has been updated in guest memory space 114 so that those changes can be propagated, via host graphics driver 116, to video memory 108. Another workflow (implemented via a "readback" synchronization primitive/command) can allow VGPU 112 to write-back modifications to the copy of the resource in video memory 108 (made by, e.g., GPU 106) to guest memory space 114, thereby ensuring that the copy in guest memory space 114 remains the canonical copy. These and other workflows are described in further detail below.

In some embodiments, VGPU memory management module 120 can also cache the graphics resource at the hypervisor level in order to improve rendering performance. In these embodiments, VGPU memory management module 120 can evict the cache at-will because the canonical version of the resource will continue to be maintained (via the synchronization workflows noted above) in guest memory space 114.

The dynamic shared system memory model described above provides a number of advantages over prior art approaches. First, since the canonical version of every graphics resource can be stored in VM guest memory, the VGPU state information required to be maintained by the hypervisor can be minimal. For instance, in one embodiment, this hypervisor-level VGPU state can simply comprise pointers to descriptor tables that identify the locations of graphics resource data/metadata in guest memory. As a result, certain virtualization features such as VM migration and fast checkpointing can be simplified because there is no need for complex logic to manage hypervisor-level VGPU state. Instead, the architected state of the VGPU is largely held in VM guest memory, which is already handled/optimized well by these virtualization features.

Second, since the present memory model allows VM guest memory to be allocated on a dynamic, on-demand basis, the amount of VM guest memory that is actually consumed for graphics purposes will depend on the level of graphics usage by guest applications. This is in contrast to the "static guest memory pool" approach, which reserves a predefined amount of guest memory whenever the VGPU is enabled, regardless of whether guest applications actually use it. Thus, the present memory model makes more efficient use of VM guest memory and flexibly allows that memory to be used for other guest tasks when not needed for graphics.

Third, because the VGPU is not required to store graphics resource data at the hypervisor level, it is easier to define hard memory limits for the host system. As mentioned above, the VGPU may maintain a cache, but the cache can be evicted at-will, and the amount of host memory allocated for the cache can be dynamically adjusted without consent or participation by the guest software. Stated another way, the present memory model avoids situations where the hypervisor cannot predict how much host memory it will need in order to maintain graphics resource data on behalf of VMs (without host swapping) since there is no hypervisor-level memory pool (other than the cache); instead, each graphics resource is backed by a portion of VM guest memory. If a particular VM uses up its entire guest memory space, the performance of that particular VM may be reduced (due to, e.g., guest swapping), but other VMs running on the same host system will remain unaffected.

Fourth, with the present memory model, it is possible to have a "zero memory copy" implementation for enabling GPU access to certain types of graphics resources (e.g., surfaces). In other words, it is possible for the GPU to directly operate on graphics resources in VM guest memory, without having to copy the resource data (via, e.g., Direct Memory Access (DMA)) to video memory.

Figure 2:
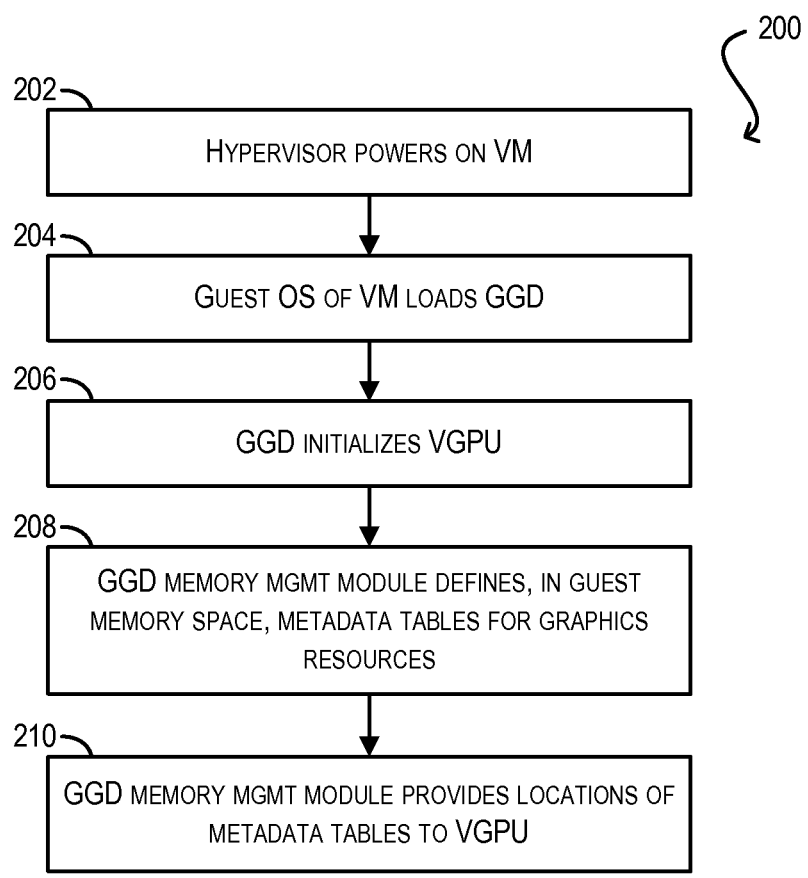
FIG. 2 depicts a flowchart for initializing a VGPU according to an embodiment.

The remainder of this disclosure describes various workflows that may be performed by GGD 110/GDD memory management module 118 and VGPU 112/VGPU memory management module 120 of FIG. 1 in order to support the use of dynamic shared system memory. For example, FIG. 2 depicts an initialization workflow 200 that may be performed by these components at the time VM 104 is powered on according to an embodiment.

Starting with block 202, hypervisor 102 can power-on VM 104 in response to, e.g., a request from a user or an automated process. Upon being powered on, a guest operating system of VM 104 can load GGD 110 (block 204).

At block 206, GGD 110 can initialize VGPU 112 for use by the guest applications of VM 104. As part of this process, GGD memory management module 118 can define tables in guest memory space 114 for holding metadata for various types of graphics resources (block 208). In a particular embodiment, GGD memory management module 118 can define one metadata table per graphics resource type, where the resource types include, e.g., contexts, surfaces, textures, shaders, vertex buffers, and so on.

Finally, at block 210, GGD memory management module 118 can provide the locations of the metadata tables in guest memory space 114 to VGPU 112, which can store the locations in one or more hypervisor-level descriptor tables.

Figure 3:
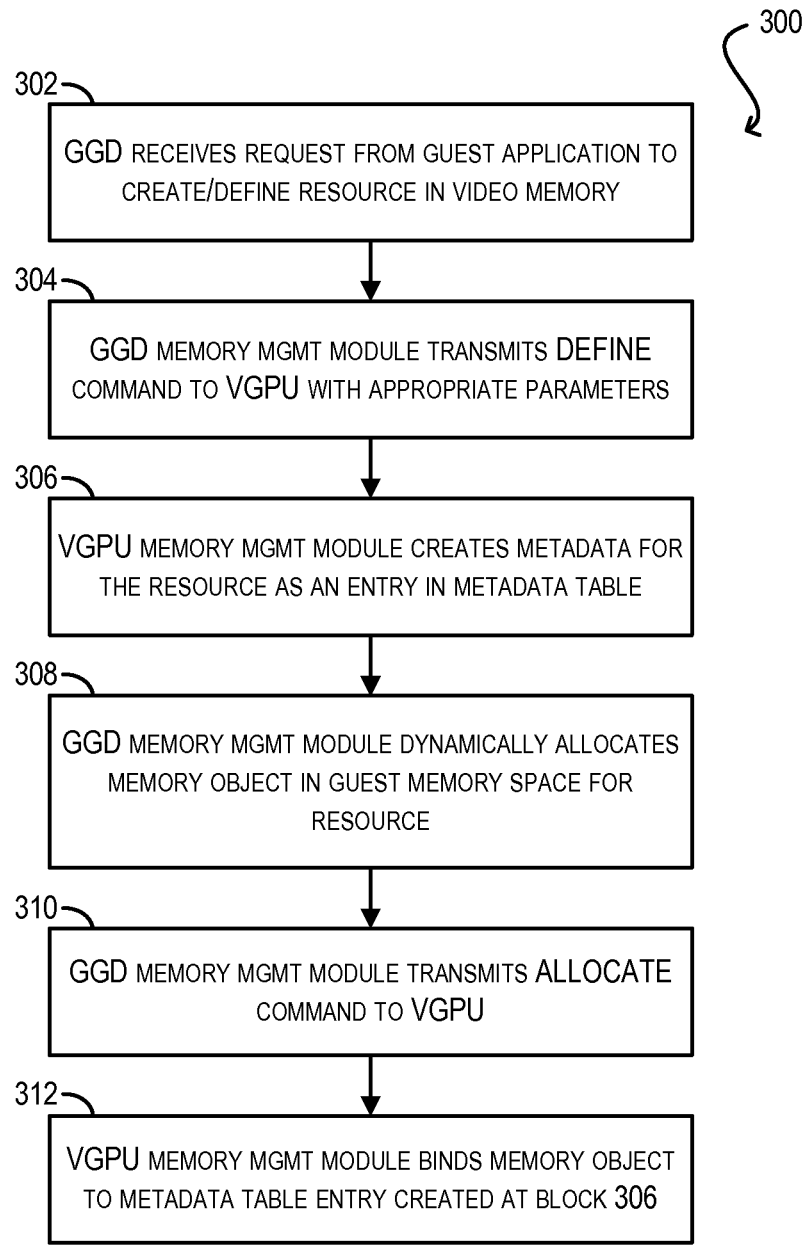
FIG. 3 depicts a flowchart for creating/defining a graphics resource in VM guest memory according to an embodiment.

FIG. 3 depicts a workflow 300 that may be performed by GGD 110/memory management module 118 and VGPU 112/memory management module 120 for dynamically creating/allocating a graphics resource in the guest memory of VM 104 according to an embodiment. Workflow 300 assumes that workflow 200 of FIG. 2 has been executed.

At block 302, GGD 110 can receive a request from a guest application of VM 104 for creating a graphics resource in the video memory of VGPU 112. In response, GGD memory management module 118 can transmit a "define" command to VGPU 112 for defining the graphics resource, with appropriate parameters (e.g., format, size, etc.) (block 304).

At block 306, VGPU memory management module 120 can receive the define command and can create, in accordance with the command parameters, a metadata entry for the graphics resource in one of the metadata tables created at block 208 of FIG. 2. For example, if the graphics resource is a texture, VGPU memory management module 120 can create an entry for the texture in the corresponding texture metadata table, with metadata identifying various properties of the texture.

Once the metadata entry has been created, GGD memory management module 118 can dynamically allocate a memory object in guest memory space 114 for the graphics resource (block 308). In a particular embodiment, this step can comprise collecting scatter-gathered portions of free memory in guest memory space 114 and representing the portions as a page table of zero, one, two, or more levels. GGD memory management module 118 can then transmit an "allocate" command to VGPU 112 indicating that the memory object has been allocated (block 310).

At block 312, VGPU memory management module 120 can bind the allocated memory object to the metadata entry created at block 306, thereby allowing GGD 110 and/or guest applications within VM 104 to write data into the object for the resource.

Figure 4:
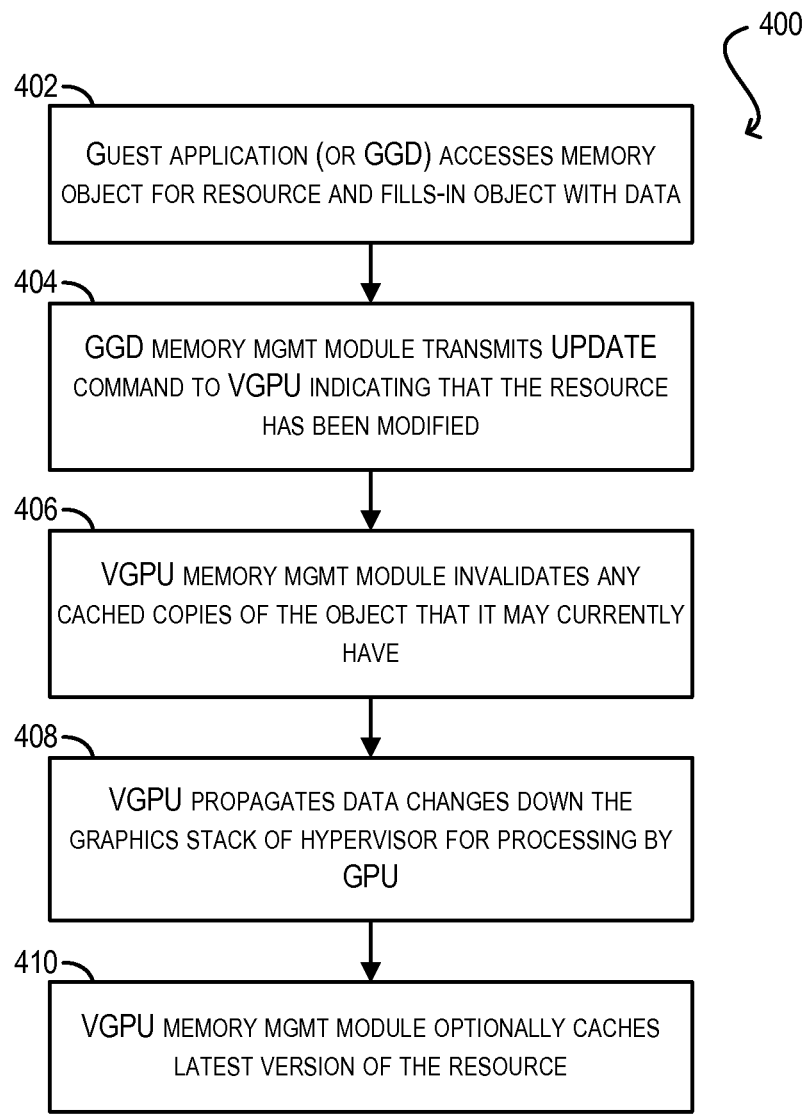
FIG. 4 depicts a flowchart for updating the graphics resource created in FIG. 3 according to an embodiment.

FIG. 4 depicts a synchronization workflow 400 that may be performed by GGD 110/memory management module 118 and VGPU 112/memory management module 120 when the graphics resource allocated in FIG. 3 is updated or modified according to an embodiment. Starting with block 402, a guest application of VM 104 (or GGD 110) can access the memory object for the graphics resource (in guest memory space 114) and can fill-in the memory object with new or modified resource data. For example, if the graphics resource is a texture, the guest application/GGD 110 can fill in the memory object with texels.

Once the memory object is filled-in, GGD memory management module 118 can transmit an "update" command to VGPU 112 indicating that the graphics resource has been modified (block 404).

Upon receiving the update command, VGPU memory management module 120 can invalidate any cached copies of the graphics resource that it may currently have (since those cached copies would now be stale) (block 406). VGPU 112 can also read the latest version of the graphics resource from guest memory space 114 and propagate this version down the graphics stack of the hypervisor 102 (i.e., to host graphics driver 116) (block 408). Host graphics driver 116 can then write the modified version of the graphics resource (if space is available) to video memory 108 of GPU 106 (block 408).

Finally, at block 410, VGPU memory management module 120 can optionally cache the latest version of the resource in its hypervisor-level cache. If the cache is full, module 120 can implement any of a number of known caching algorithms (e.g., LRU, etc.) to determine which resources to discard in order to make room for the current resource.

Figure 5:
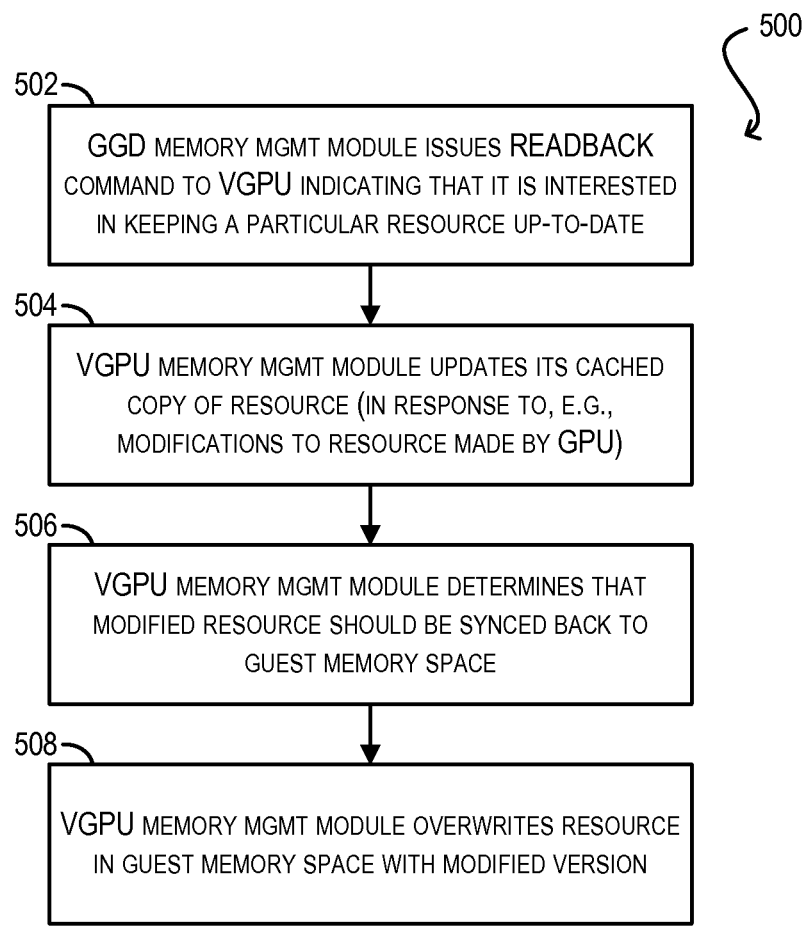
FIG. 5 depicts a flowchart for synchronizing changes to a graphics resource (made by, e.g., a physical GPU) back to the copy in VM guest memory according to an embodiment.

Some types of graphics resources are not only updated by guest applications, but are also actively modified by the GPU during the rendering process. One example is a render target. For these resource types, GGD 110/VGPU 112 may want the GPU-initiated modifications to be written back to the version of the graphics resource stored in guest memory space 114 (which has become stale). For instance, if hypervisor 102 wishes to take a checkpoint of the VM or migrate it to another host machine, GGD 110/VGPU 112 needs to ensure that the graphics resources in guest memory space 114 are up-to-date. FIG. 5 depicts a synchronization workflow 500 for implementing such a write-back process according to an embodiment.

At block 502, GGD memory management module 118 can issue a "readback" command to VGPU 112 indicating that it is interested in keeping a particular graphics resource in guest memory space 114 up-to-date.

At block 504, VGPU memory management module 120 can determine that the resource has been modified by, e.g., GPU 106, and can update its cached copy of the resource (if such a cached version exists) to reflect the modifications.

At block 506, VGPU memory management module 120 can determine that the GPU-modified resource should be synced back to guest memory space 114 (due to, e.g., receipt of the readback command at block 502).

Then, at block 508, VGPU memory management module 120 can overwrite the copy of the resource in guest memory space 114 with the GPU-modified version. In a particular embodiment, module 120 can perform this write-back step without any involvement by GGD 110.

Figure 6:
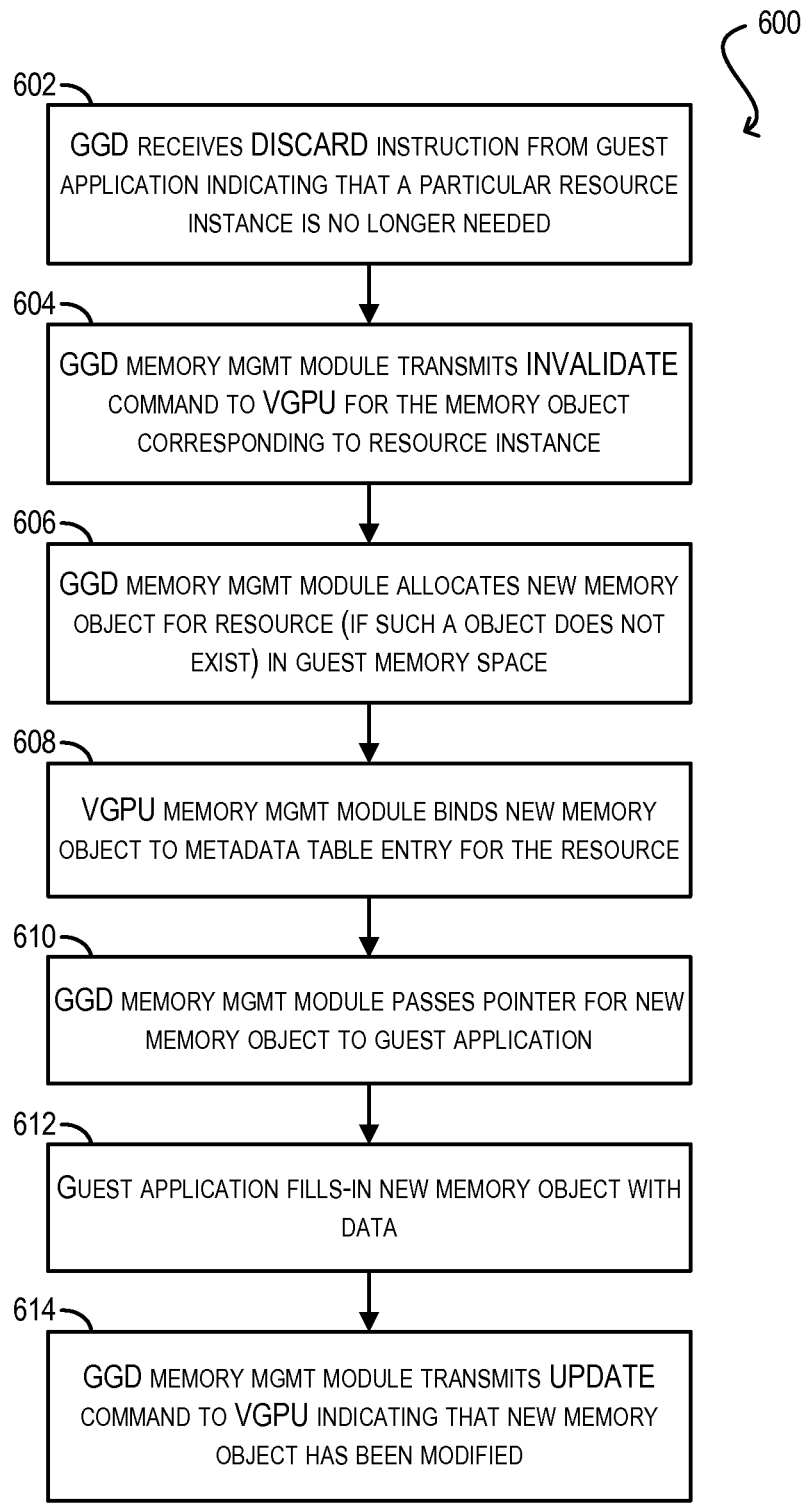
FIG. 6 depicts a flowchart for invalidating the graphics resource updated in FIG. 4 according to an embodiment.

Another special category of graphics resources to consider when implementing dynamic shared system memory comprises resources that are updated very often during the rendering process (e.g., vertex buffers, which are typically updated every frame). The workflow for synchronizing modifications to these types of resources from VM guest memory to physical video memory is identical to that described in FIG. 3. However, the communication between GGD 110 and VGPU 112 is generally implemented using an asynchronous command queue (e.g., GGD 110 places the update command in the command queue and VGPU 112 processes the command at some later point in time). This means that there might be scenarios where a guest application wants to discard/invalidate an existing memory object for a resource so that it can write new data for the resource for the latest frame, without having to wait for VGPU 112 to process the existing object. FIG. 6 depicts a synchronization workflow 600 for enabling this pattern in the context of dynamic shared system memory according to an embodiment.

Starting with block 602, GGD 110 can receive a "discard" instruction from a guest application indicating that a particular instance of a graphics resource is no longer needed by the application. For example, the graphics resource may be a vertex buffer that contains vertex data for a previous frame, which is now inapplicable for the current frame being rendered.

Upon receiving the discard instruction, GGD memory management module 118 can transmit an "invalidate" command to VGPU 112 for the memory object that corresponds to the resource identified at block 602 (block 604). In addition, GGD memory management module 118 can dynamically allocate a new memory object for the graphics resource in guest memory space 114 (if such a new memory object has not already been allocated) (block 606).

At block 608, VGPU memory management module 120 can receive the invalidate command and can bind the new memory object to the metadata entry for the resource (block 608). GGD memory management module 118 can then pass a pointer to the new memory object to the guest application (block 610).

At block 612, the guest application can fill-in the new memory object with data (e.g., vertex data for the current frame). Finally, GGD memory management module 118 can transmit an update command to VGPU 112 indicating that the new memory object has been modified (block 614), which VGPU 112 can process in accordance with blocks 406-410 of the update workflow of FIG. 4.

Certain embodiments as described above involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operation system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   receiving, by a host system, a request to create a graphics resource from a guest application of a virtual machine (VM) running on the host system; and
   in response to the request, dynamically allocating, by the host system via a guest graphics driver running within the VM, a memory object for the graphics resource in a guest memory space of the VM.

2. The method of claim 1 further comprising, prior to the dynamically allocating:
   transmitting, by the guest graphics driver to a virtual graphics processing unit (VGPU) of the host system, a command to store metadata for the graphics resource; and
   storing, by the VGPU in response to the command, the metadata for the graphics resource in an entry of a metadata table maintained in the guest memory space.

3. The method of claim 2 wherein the memory object is bound to the entry of the metadata table after the memory object is allocated.

4. The method of claim 1 wherein the memory object comprises scatter-gathered memory pages in the guest memory space.

5. The method of claim 1 further comprising:
   receiving, by a VGPU of the host system, a command from the guest graphics driver indicating that the memory object has been modified;
   invalidating, by the VGPU, any previously cached copies of the memory object;
   propagating, by the VGPU, the modified version of the memory object to a graphics processing unit (GPU) of the host system; and
   caching, by the VGPU, the modified version of the memory object.

6. The method of claim 5 further comprising:
   updating, by the VGPU, its cached copy of the memory object in response to modifications to the memory object made by the GPU;
   determining, by the VGPU, that the GPU-modified version of the memory object should be synchronized back to the guest memory space of the VM; and
   overwriting, by the VGPU, the memory object in the guest memory space with the GPU-modified version.

7. The method of claim 5 further comprising:
   receiving, by the VGPU, a command from the guest graphics driver indicating that the memory object is no longer needed by the guest application; and binding, by the VGPU, a newly allocated memory object for the graphics resource to the entry of the metadata table.

8. A non-transitory computer readable storage medium having stored thereon program code executable by a host system, the program code embodying a method that comprises:

receiving, by a guest graphics driver running within a virtual machine (VM) of the host system, a request to create a graphics resource from a guest application of the VM; and dynamically allocating, by the guest graphics driver in response to the request, a memory object for the graphics resource in a guest memory space of the VM.

9. The non-transitory computer readable storage medium of claim 8 wherein the method further comprises, prior to the dynamically allocating:

transmitting, by the guest graphics driver to a virtual graphics processing unit (VGPU) of the host system, a command to store metadata for the graphics resource; and storing, by the VGPU in response to the command, the metadata for the graphics resource in an entry of a metadata table maintained in the guest memory space.

10. The non-transitory computer readable storage medium of claim 9 wherein the memory object is bound to the entry of the metadata table after the memory object is allocated.

11. The non-transitory computer readable storage medium of claim 8 wherein the memory object comprises scatter-gathered memory pages in the guest memory space.

12. The non-transitory computer readable storage medium of claim 8 wherein the method further comprises:

receiving, by a VGPU of the host system, a command from the guest graphics driver indicating that the memory object has been modified;

invalidating, by the VGPU, any previously cached copies of the memory object;

propagating, by the VGPU, the modified version of the memory object to a graphics processing unit (GPU) of the host system; and caching, by the VGPU, the modified version of the memory object.

13. The non-transitory computer readable storage medium of claim 12 wherein the method further comprises:

updating, by the VGPU, its cached copy of the memory object in response to modifications to the memory object made by the GPU;

determining, by the VGPU, that the GPU-modified version of the memory object should be synchronized back to the guest memory space of the VM; and overwriting, by the VGPU, the memory object in the guest memory space with the GPU-modified version.

14. The non-transitory computer readable storage medium of claim 12 wherein the method further comprises:

receiving, by the VGPU, a command from the guest graphics driver indicating that the memory object is no longer needed by the guest application; and binding, by the VGPU, a newly allocated memory object for the graphics resource to the entry of the metadata table.

15. A host system comprising:

a processor;
a virtual machine (VM);
a guest graphics driver running within the VM;
a graphics processing unit (GPU);
a virtual graphics processing unit (VGPU); and
a non-transitory computer readable medium having stored thereon program code that, when executed by the processor, causes the processor to:

receive, via the guest graphics driver from a guest application running within the VM, a request to create a graphics resource in a guest memory space of the VM; and dynamically allocate, via the guest graphics driver in response to the request, a memory object for the graphics resource in the guest memory space.

16. The host system of claim 15 wherein the program code further causes the processor to, prior to the dynamically allocating:

define metadata for the graphics resource; and
store the metadata in an entry of a metadata table maintained in the guest memory space.

17. The host system of claim 16 wherein the memory object is bound to the entry of the metadata table after the memory object is allocated.

18. The host system of claim 15 wherein the memory object comprises scatter-gathered memory pages in the guest memory space.

19. The host system of claim 15 wherein the program code further causes the processor to:

receive, via the VGPU, a command from the guest graphics driver indicating that the memory object has been modified;

invalidate any previously cached copies of the memory object;

propagate the modified version of the memory object to the GPU; and cache the modified version of the memory object.

20. The host system of claim 19 wherein the program code further causes the processor to:

update, via the VGPU, the cached copy of the memory object in response to modifications to the memory object made by the GPU;

determine that the GPU-modified version of the memory object should be synchronized back to the guest memory space of the VM; and overwrite the memory object in the guest memory space with the GPU-modified version.

21. The host system of claim 19 wherein the program code further causes the processor to:

receive, via the VGPU, a command from the guest graphics driver indicating that the memory object is no longer needed by the guest application; and bind a newly allocated memory object to the entry of the metadata table.

\* \* \* \* \*